(No Model.) 2 Sheets—Sheet 1.
C. COLAHAN.
GRAIN BINDER.
No. 315,481. Patented Apr. 14, 1885.
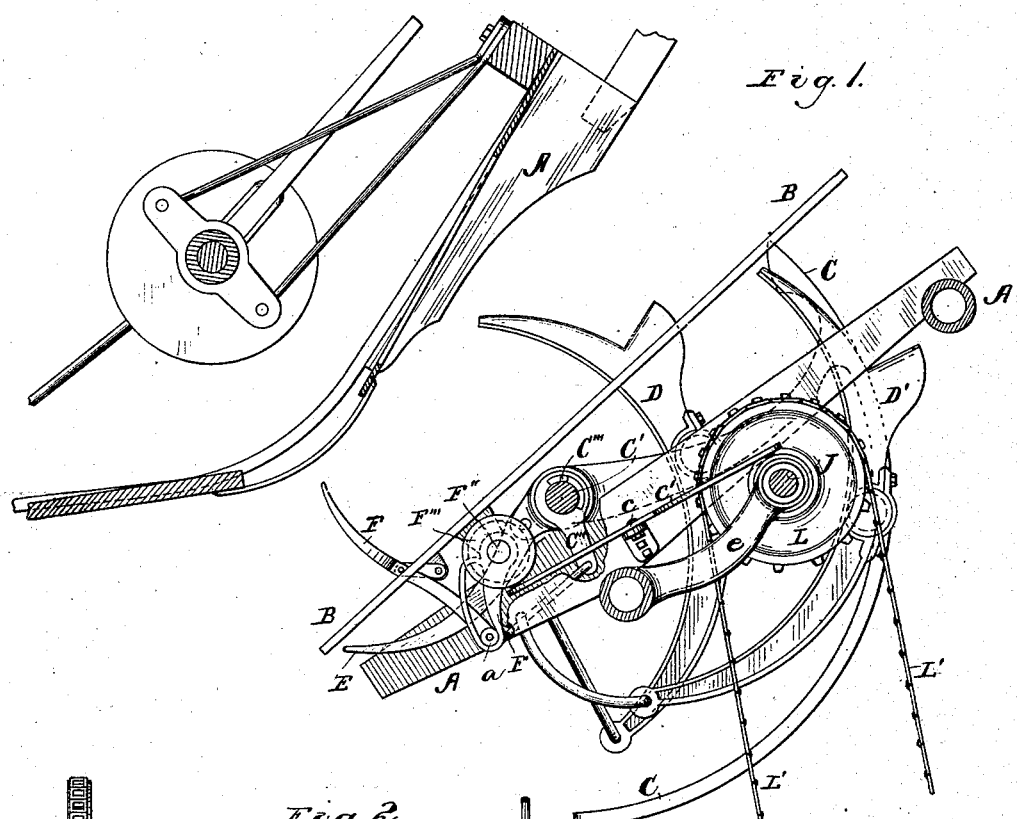
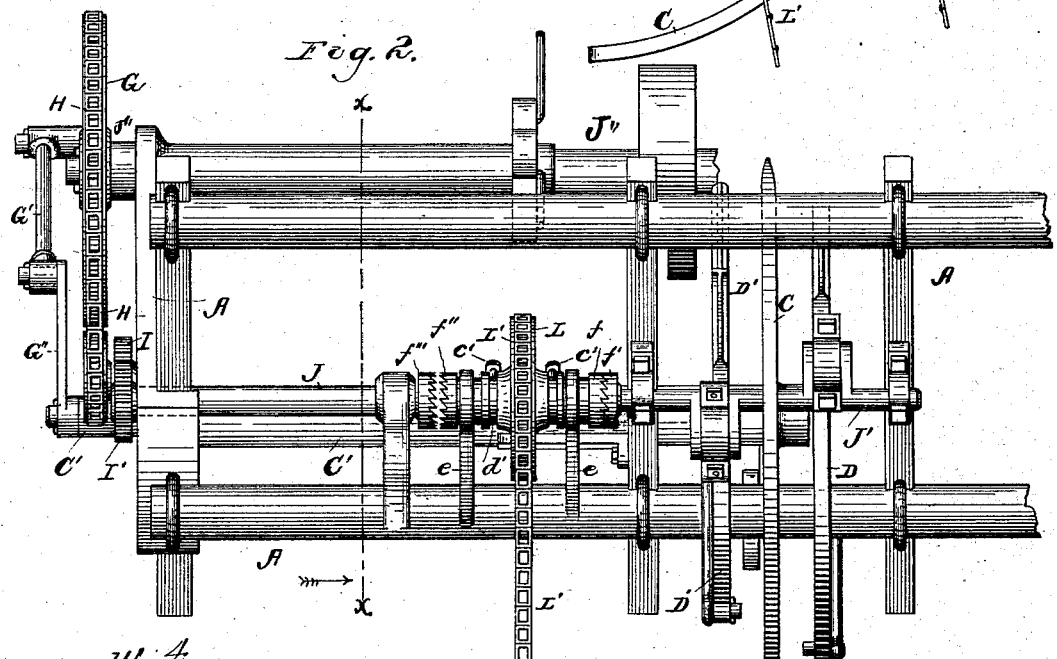
Witnesses,
Inventor,
Chas. Colahan (No Model.) 2 Sheets—Sheet 2.

C. COLAHAN.
GRAIN BINDER.

No. 315,481. Patented Apr. 14, 1885.

Witnesses.
Henry Frankfurter
W. L. Baker

Inventor.
Chas. Colahan

UNITED STATES PATENT OFFICE.

CHARLES COLAHAN, OF CLEVELAND, OHIO.

GRAIN-BINDER.

SPECIFICATION forming part of Letters Patent No. 315,481, dated April 14, 1885.

Application filed November 24, 1883. (No model.)

*To all whom it may concern:*

Be it known that I, CHARLES COLAHAN, a citizen of the United States, residing at Cleveland, in the county of Cuyahoga and State of Ohio, have invented certain new and useful Improvements in Grain-Binders, of which the following is a description.

The object of my invention is to provide a perfect and simple mechanism for binding grain automatically into bundles of a predetermined size, and the simplicity of my invention is of great advantage to the manufacturer who constructs it, and of equal importance to the farmer who uses it, as there are so few parts required in the complete mechanism, and its operation requires so little power to draw it over the field and to bind grain, and it is so free from friction and liability to wear or breakages; and in order to describe my invention more particularly, so that others may understand the construction and operation of my improvements, I would refer to the accompanying drawings, wherein—

Figure 3:
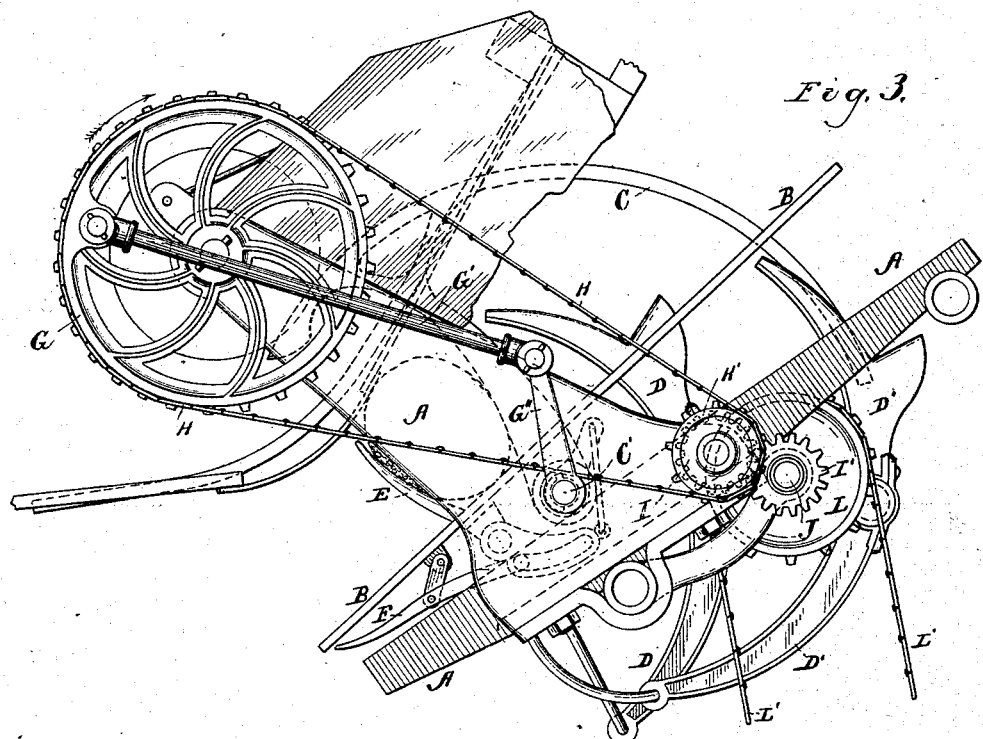
Figure 5:
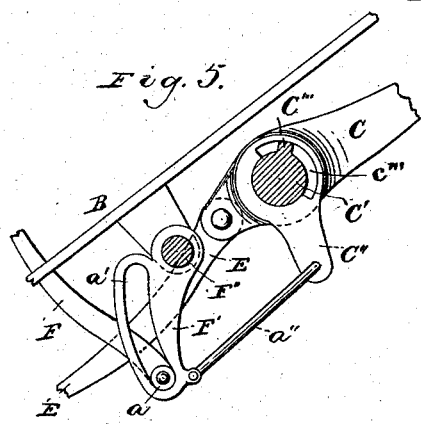
Figure 4:
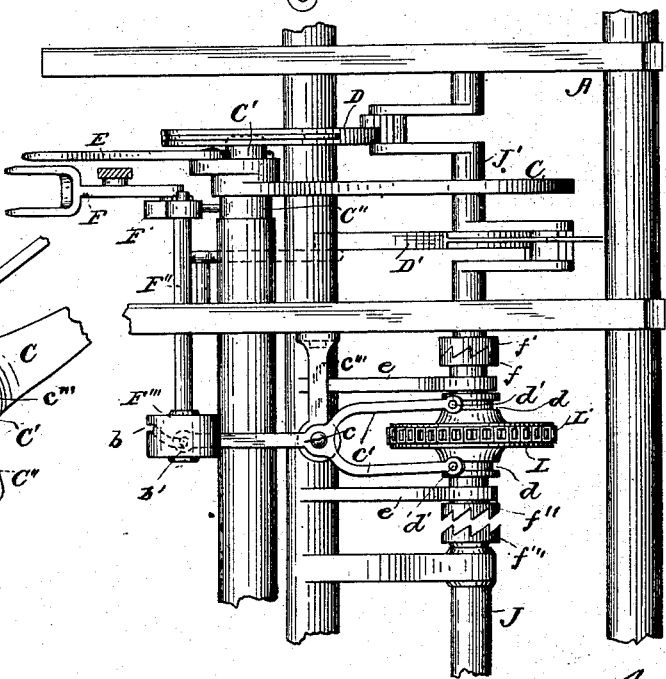

Figure 1 represents a section on line $x\ x$ of Fig. 2, looking in direction indicated by arrow, showing the binder in a position for receiving the inflowing grain, with the packing-arms in operation and the trip-finger raised in the receiver to check the grain. Fig. 2 is a sectional rear view of same, and clearly shows the driving sprocket-wheel L as being connected by clutch-halves $f\ f'$ to the packer-shaft J' and disconnected from the binder driving-shaft J. Fig. 3 is an end elevation of part of grain-binding mechanism, showing position of same while in operation of binding, with the trip-finger below the table while bundle is held and formed between the compressing and binder arms. Fig. 4 represents a view looking down on the mechanism. Fig. 5 is a detail view of trip mechanism, showing the connection of same with binder-arm shaft, by means of the swinging crank-arm C", with its slot and the projection C''' on said shaft.

A is the main binder-frame secured to harvester by its frame-support in the usual manner. B is the receiver.

L is the driving pulley and shaft, that receives its operative movement from the harvester by means of gearing, or, as I have here shown it, by a chain sprocket-wheel, as indicated by L L'. This sprocket-wheel revolves freely in its support or bearings $e\ e$, and its shaft is provided at each end with clutch-halves, and is free to move endwise therein, so that its clutch-halves may be brought alternately into contact with clutch-halves $f'\ f''$, which shall first cause the packer device to gather the grain into the binder, and then cause the packers D D' to cease and the binder to bind the bundle.

J is the shaft, with its clutch-half $f'''$, which, when brought in contact with the driving-clutch half $f''$, will communicate motion to the main actuating-shaft J" of the binder through means of the chain belt H and its sprocket-wheel G. The intermediate gear-wheels, I I', are for giving desired speed or direction to said chain belt H and its sprocket-wheel H'.

J" is the main shaft, actuating the mechanism that binds the grain and a crank secured to said shaft by means of its sprocket-wheel for the attachment of the pitman-rod G', that also actuates its corresponding crank, G", which is secured to and actuates the binder-arm shaft C', the binder-arm C being secured on the inner end of said shaft C'.

E is the yielding elastic compressor-arm, which is actuated by the binder-arm.

F is the tripping-finger, and serves to check the grain in connection with the cord which is held at one end by the devices located above the receptacle, while said cord extends down near the tripping-finger to the binder-arm, and will thus stop and arrest the ingathering grain until the compressing-arm shall rise to form the bundle in connection with the binder-arm. Said stop will yield under the pressure of the inflowing grain and through its movements and connection cause the shaft F" to partially revolve.

F''' is a grooved cam-roller or cylinder secured to said shaft F".

$c$ is a clutch-lever controlling the movements and position of the chain sprocket-wheel. $b'$ is a friction roller and pin secured to one end of said lever.

$c'$ is the clutch sliding yoke, and is part of the lever $c$.

C" is an arm or crank swung loosely on the shaft C', and is provided with a slot or recess, $c''$, which admits the travel of a lug, C''', secured on the binder-arm shaft C', and of its free movement therein as it is forced back by the connecting-rod a'' and the roller a, traveling in the slot or groove a' as the finger F recedes under the pressure of the inflowing grain. This slot c''' also admits a partial revolution of the binder-arm shaft until the compressor has advanced into the receiver to support the grain and form the outside of the bundle, when the projection C''' on the shaft of the binder-arm will come in contact with the termination of the slot or recess on the inner side of said swinging crank, and cause it to revolve by means of its connection with the rod a'', carry the rocking cam-crank F' back, and thus depress the tripping-finger below the receiver.

Having thus indicated the different parts of my binder, I will now more fully describe its operation. The grain is packed into the receptacle until the quantity desired for a bundle is deposited therein, when its pressure against the tripping-finger F will cause it to rock on its swinging fulcrum, and the lower end of said finger will force the crank F' to revolve the shaft F'' and its grooved roller F''', by means of the cam-slot b therein, which will cause the clutch-lever pin b', that travels in said cam slot or groove, to force the yoke c' toward and to connect the clutch-halves f'' f''' and separate the clutch-halves f f', thus stopping the packers, and at the same instant causing the binder to be put in operation, when the binder-arm and compressing-arm will enter the receiver and form the bundle, and after its discharge the parts assume their normal position, and the binder-arm shaft will cause the arm or crank F' to force the trip-finger F back into the receiver.

Having thus shown and described my invention, I claim—

1. In an automatic grain-binder, the combination of the stopping and tripping finger F, the crank F', and its shaft F'', the pivoted yoke, the lever-moving cam F''', the yoke-lever c, and the drive-wheel L and its shaft for alternately stopping and starting the binding devices, substantially as shown and described.

2. The combination of the power-wheel L, the shaft J, the gear-wheels I I', sprocket-wheel G' H', and chain H, substantially as shown and described.

3. The combination of the power-wheel L and its clutch-halves for alternately stopping and starting the reciprocating packing-arms D D' and their crank-shaft J', and its clutch-half f', and the shaft J, its clutch-half f''', and its pinion I', actuating the binding device at stated intervals, substantially as shown and described.

4. The crank C'', with its slot therein, in combination with the binder-arm shaft C', and its projection C''', and the tripping-fingers F with the connecting device, whereby the tripping device may be withdrawn from the receiver, substantially as shown and described.

5. The swinging crank-arm C'', combined with the binder-arm or its shaft, and projection C''' thereon for controlling and actuating the tripping-finger, substantially as shown and described.

6. The combination of the packers D D', tripping-finger F, crank F' and its shaft F'', cam-wheel F''', lever c, power-wheel L, and clutch-halves f f' f'' f''', substantially as and for the purposes set forth.

CHARLES COLAHAN.

Witnesses:
FREDERICK C. GOODWIN,
A. M. STOUT.